Figure 1:
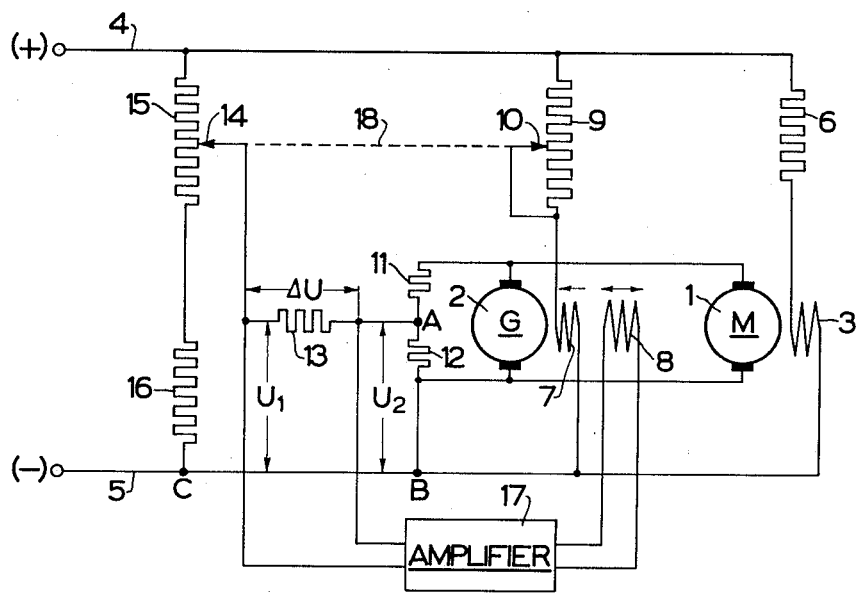

INVENTOR:
PAUL VOLK

United States Patent Office 2,727,196
Patented Dec. 13, 1955

2,727,196

VARIABLE SPEED CONTROL SYSTEMS FOR A WARD LEONARD DRIVE

Paul Volk, Erlangen, Germany, assignor to Siemens-Schuckertwerke Aktiengesellschaft, Erlangen, Germany Application June 13, 1951, Serial No. 231,314
In Germany March 23, 1950

Public Law 619, August 23, 1954
Patent expires March 23, 1970

5 Claims. (Cl. 318—142)

My invention relates to variable-voltage drives of the Ward Leonard type for the operation of fabricating machinery of greatly variable load such as planers or the like machine tools.

With respect to regulating performance, such drives are called upon to satisfy increasingly exacting requirements. While in the past, a variable-voltage drive with a regulated speed range of about 1 to 6 was considered satisfactory for planers, for instance, it is now often necessary to provide a range of 1 to 10, and there are also applications in which a range of 1 to 30 is desirable. Securing such wide ranges of speed control with the known variable-voltage drives involves considerable difficulties which very greatly increase if the drive is also supposed to maintain a substantially constant drive speed down to the lowermost portion of the available speed range. This problem cannot be solved with the basic Ward Leonard circuit alone. Therefore, various control systems have been developed in which the generator of the variable-voltage drive is field controlled by an additional regulating generator whose voltage has a boosting effect upon the generator field for avoiding or considerably reducing the drop in motor speed due to increasing motor load. Such control systems have the disadvantage of introducing considerable complications into the drive system.

It is therefore an object of my invention to provide a variable voltage drive which is capable of satisfactory speed regulation over a wide range while requiring simpler and more reliable circuit means than heretofore necessary. Another object of my invention is to devise a control system for a wide range of speed control and regulation which, in conjunction with a simple and reliable design, offers the advantage of comprising only static control components thus reducing the maintenance requirements in comparison with known systems of comparable performance.

In order to achieve these objects and in accordance with a feature of my invention, I provide the generator of a variable-voltage drive with two field excitation circuits which are separately controllable in electrical respects but are correlated in the following manner. One of the two excitation circuits is energized from constant voltage supply means under control by an adjustable circuit member preferably a rheostat. The adjusted excitation voltage of this circuit is of the magnitude needed for normally operating the generator at the desired speed. Hence, the pertaining control member or rheostat represents the main speed control element of the system and permits adjusting the basic field excitation of the generator in accordance with the desired motor speed over the entire available control range. The second field excitation circuit of the generator is energized in dependence upon a variable and reversible control voltage which is the differential resultant of an adjusted reference voltage of normally constant magnitude and a variable voltage substantially proportional to the motor speed. The variable field excitation thus superimposed upon the adjusted constant excitation has a boosting effect when the motor speed is below the desired value to which the speed control member of the main excitation is adjusted, but becomes zero and reverses when the motor speed reaches and exceeds the desired value. Thus the system imposes on the variable voltage drive a very strong forcing action at the starting or reversing moments of the motor and thereafter functions to regulate the motor speed for substantially maintaining the adjusted value. In order to secure this performance regardless of whether the speed control member is set to speed values in the upper or lower portions of the available range, the above-mentioned constant reference voltage must be given a different adjustment for each respectively different adjustment of the speed control member. Preferably therefore the speed control member and the means for adjusting the reference voltage are mechanically or otherwise connected with each other so that a change in adjustment of one is always accompanied by the proper adjustment change of the other, these two adjustments being in the same sense so that, for instance, an increase in main field excitation is always accompanied by an increase in reference voltage.

According to still another feature of my invention the above mentioned differential voltage for controlling the regulating field excitation to be superimposed upon the adjusted main field excitation is applied to an impedance member which forms the input stage of an amplifying device of the static type. According to a more specific feature related to the one just mentioned, the impedance member consists of the control coil means of a saturable reactor pertaining to a magnetic amplifier whose amplified output voltage is applied to the field winding means of the generator.

Figure 2:
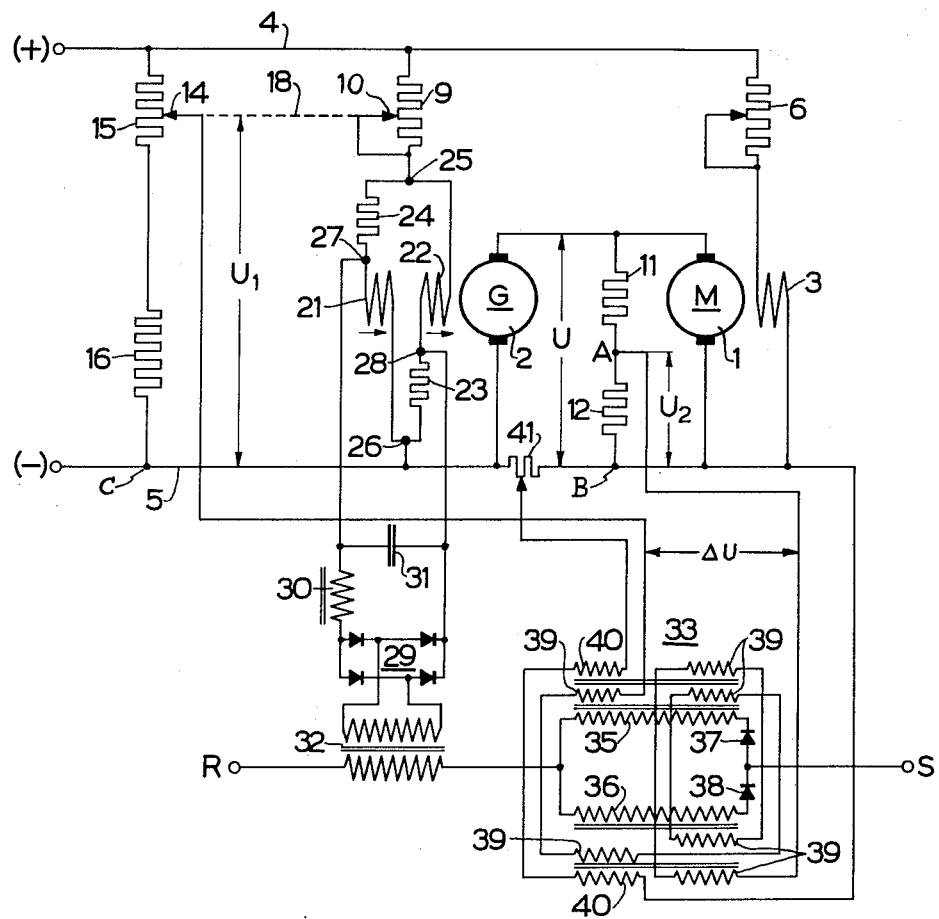

The foregoing and more specific objects and features of the invention will be apparent from the following description in conjunction with the drawing in which:

Fig. 1 illustrates the basic circuit diagram of a variable-voltage drive according to the invention; and Fig. 2 shows in greater detail a modified embodiment of the invention incorporating features of the circuit shown in Fig. 1.

The variable-voltage drive according to Fig. 1 has the armature 1 of its direct-current motor M connected with the armature 2 of the pertaining generator G operating at normally constant speed. The field winding 3 of the motor receives constant excitation from the buses 4 and 5 of a direct-current supply of substantially constant voltage, a field resistor 6 being series connected with winding 3 if desired. Because of its constant field excitation, the speed of motor M depends upon the voltage of generator G. This voltage is controlled by the resultant excitation of two cumulative generator field windings 7 and 8. Field winding 7 receives excitation from the constant-voltage buses 4 and 5 through a speed control rheostat 9. This excitation has the magnitude necessary for providing the full generator voltage needed for any desired motor speed within the entire speed range. Consequently, the speed adjustment of the drive is basically determined by the selected setting of the rheostat slider 10.

The field winding 8 serves to superimpose on the generator G an additional field excitation to provide the above-mentioned forcing and regulating action. The excitation of field winding 8 therefore is variable and dependent upon the speed conditions of the motor. The circuit for controlling this variable field excitation comprises two resistors 11 and 12 series connected with each other across the armature circuit of the drive. Connected to a tap point A between resistors 11 and 12 is an impedance member 13 consisting preferably of an ohmic or inductive resistance. The other end of impedance member 13 is connected to the adjustable tap 14 of a rheostat 15 which is series connected with a resistor 16 across the constant-voltage buses 4 and 5 to form a voltage divider. The just-mentioned circuit connection is such that the points B and C of the voltage dividers 11, 12 and 15, 16 have nearly the same potential. Consequently, the voltage drop $\Delta U$ across impedance member 13 is equal to the difference between the adjusted constant reference voltage $U_1$ between slider 14 and point C and the condition-responsive variable voltage $U_2$ across points A and B. The variable voltage $U_2$ is proportional to the voltage impressed upon the motor armature 1 and hence approximately proportional to the motor speed. The polarity of the voltage drop across impedance member 13 depends upon which of the two voltages $U_1$ and $U_2$ is larger than the other at a time.

The resistance conditions are so selected that when the motor M runs at the desired speed determined by the selected setting of the slider 10 of control rheostat 9, the variable voltage $U_2$ across resistor 12 is equal to the adjusted reference voltage $U_1$. Then, the impedance member 13 is impressed by two equal and mutually opposing voltages so that the voltage drop $\Delta U$ is zero. When the load on generator G is increased, the reference voltage $U_1$ remains constant while the generator voltage and the proportional voltage $U_2$ become smaller. Consequently, a difference voltage now appears across impedance member 13 in the direction from control rheostat slider 14 to point A. This difference voltage controls the field windings 8 through an amplifier 17 to provide a boosting excitation which adds to the main excitation of field windings 21, 22 and causes the generator voltage to increase to the required value. The motor speed is affected in the same sense and hence prevented from dropping excessively.

On the other hand, if the load upon the generator decreases the generator voltage and the desired voltage $U_2$ increase. As a result, a difference voltage appears across impedance member 13 in the direction opposed to that previously considered. The reversed control voltage now causes the field windings 21, 22 to be excited in opposition to the main field thus reducing the generator voltage to the desired condition.

When the drive is started or reversed so that the generator voltage must build up from the zero value, the adjusted constant reference voltage $U_1$ is at first alone or predominately effective so that the magnitude and polarity of the excitation component supplied by field winding 8 are essentially determined by the reference voltage. This excitation is cumulative to the main field excitation of the generator and since its magnitude is always comparatively high, a strong forcing effect is imposed on the generator. In this manner, a rapid starting and reversing is secured, this being of considerable advantage for planers and the like machine tools subjected to frequent reversing or stopping. The just-mentioned performance requires that for any selected speed adjustment of the control rheostat 15 and hence for any selected magnitude of main field excitation, the reference voltage $U_1$ must be selected accordingly. While this may be done by having the operator adjust both rheostats in accordance with pertaining correlated scale calibrations or the like indicia, the sliders 10 and 14 are preferably interconnected, for instance, mechanically as indicated by a connecting line 18. Only a single adjustment to the desired speed value is then required to set the drive for a desired operating condition.

When, as in the above described embodiment, the regulating field excitation superimposed upon the main excitation of the generator is controlled only in dependence upon the generator voltage, the regulation of the motor speed for accurate maintenance of a constant value is strictly only an approximate one. However, it has been found that, since in a system according to the invention the motor speed is mainly and predominantly determined by the main field excitation adjusted at rheostat 15, the occurring inaccuracies of speed regulation remain well within the required limits for many cases of application.

Among the possibilities of applying the differential voltage $\Delta U$ into the field excitation of the generator, the one embodied in the drive according to Fig. 2 is distinguished by utmost simplicity of design and highest reliability of maintenance-free operation. These advantages are due to a particular combination of the above-explained features with a magnetic amplifier comprising saturable reactor means in connection with rectifying devices.

In Fig. 2 the elements denoted by numerals between 1 and 18 correspond to the respective similarly denoted elements of the drive according to Fig. 1. It will be recognized that, as in the embodiment of Fig. 1, the system of Fig. 2 has a control rheostat 9 whose selected setting determines the desired speed of the motor M by correspondingly adjusting a normally constant main component of field excitation for the generator G. Also in accordance with the embodiment previously described, the drive system of Fig. 2 is equipped with an adjustable rheostat 15 energized from direct-current supply buses 4, 5 of substantially constant voltage for providing a reference voltage which is constant for each selected setting of the main speed controlled rheostat 9 but changes its value when the main control rheostat is set for a different motor speed. Also as described, the just-mentioned constant reference voltage $U_1$ is compared with a variable voltage $U_2$ taken from a voltage dividing series connection of resistors 11 and 12 across the armature circuit of the drive.

The two cumulative field windings 21 and 22 are preferably given equal resistances and equal numbers of turns. The two field windings are connected in parallel relation to each other, each in series with a resistor 23 or 24 so as to form a closed loop with two pairs of diagonal points 25, 26 and 27, 28 between the field windings and resistors. The resistors 23 and 24 may be given the same ohmic resistance as the field windings. At the diagonal points 25 and 26, the loop circuit is connected in series with the main control rheostat 9 across the constant-voltage buses 4 and 5. Consequently, under the above mentioned conditions the two field windings 21 and 22 are energized in the same sense by a constant direct current whose magnitude depends upon the setting of the main control rheostat 9.

The variable regulating voltage to be superimposed upon the constant excitation of the generator field windings is applied between the circuit points 27 and 28 from a rectifier 29, preferably through a filter circuit shown as comprising a series reactor 30 and a shunt capacitor 31. The rectifier 29 is connected with a magnetic amplifier, for instance, through a transformer 32, a direct series connection being applicable instead.

The magnetic amplifier 33 is of the valve reactor type. That is, this amplifier comprises a pair of saturable reactors whose reactance windings, denoted by 35 and 36 respectively, are individually series connected with respective valves 37 and 38 preferably of the barrier-layer type. The poling of valves 37 and 38 is mutually opposed so that one half wave of the alternating current applied to the terminals R and S passes through one reactance winding while the next half wave passes through the other winding. With both parallel branches balanced, the amplitudes of the two half waves are equal so that it is inessential whether the reactor operates along one or the other branch of its saturation characteristic. The magnetizable core of the reactor is equipped with control windings whose excitation determines the effective impedance of the reactance windings. The control windings are subdivided into a number of coils 39 which are all series connected between the tap 14 and point A and hence are impressed by the above-mentioned voltage $\Delta U$. Each two of coils 39 are disposed on the respective reactor cores or core portions with the poling needed to have the induced alternating voltages substantially cancel each other. Consequently, the coils 39 are subjected only to direct-current induction due to the rectified currents passing through the respective valves 37 and 38. The subdivision into a number of coils 39 has the purpose to minimize the voltage drop of the individual coil so that each need be insulated only for a correspondingly low voltage drop. Suppose, for instance, that the total voltage ΔU impressed on the control windings is 300 volts and that the windings are subdivided into three coils 39, then each coil is subjected to a voltage of only 100 volts.

If a unidirectional voltage is impressed upon control coils 39, this voltage produces a corresponding premagnetization of the saturable reactor. This reduces the effective reactance of main windings 35, 36 and thus increases the voltage impressed upon the rectifier 29. The resulting effect upon the generator field excitation is as follows.

When the adjusted reference voltage $U_1$ is balanced against the condition-responsive voltage $U_2$, the magnetic amplifier furnishes a given voltage through the transformer 32 and the rectifier 29 to the diagonal points 27 and 28 of the generator field circuit. If desired, the circuit can be adjusted so that under the just-mentioned balance condition the voltage impressed across field circuit points 27 and 28 is at a finite value positive at point 27 and negative at point 28. Under the balance condition the motor M runs at the speed determined by the setting of the rheostats 9 and 15.

If now the load on the generator G is increased due, for instance, to a heavier mechanical load upon the drive motor M, then the generator voltage U tends to drop. The tapped-off voltage $U_2$ drops proportionally and becomes smaller than the adjusted constant reference voltage $U_1$. As a result, a differential voltage is impressed on the reactor control coils 39 in the sense of an increased magnetization of the saturable reactor 33. The voltage impressed on the rectifier 29 increases and so does the rectified voltage applied across points 27 and 28 of the field excitation circuit. This has the effect of eliminating the load-responsive voltage reduction, thus causing motor M to substantially maintain its desired speed.

When the load on the generator G decreases, the voltage $U_2$ tends to increase relative to the adjusted constant voltage $U_1$. Hence, the reactor control coils 39 are now excited by a differential voltage of the reversed direction acting in the magnetization reducing sense. Consequently, the voltage of rectifier 29 drops and a correspondingly reduced excitation voltage is impressed across points 27 and 28 of the generator field circuit. This causes a reduction in the generator voltage U by the amount needed to restore the motor speed to the correct value.

An accurate regulation for constant motor speed even for most exacting requirements may be achieved, without necessity of using a tachometer generator, if an I R drop compensating control component is introduced into the reactor system. Such a compensation is obtained in the illustrated embodiment with the aid of additional control winding 40 on both portions of the saturable reactor. This winding may be subdivided for eliminating undesired transformer effects in the manner previously explained. The winding 40 is connected across a series resistor 41 in the common armature circuit of the motor and generator. As shown, the resistor may be adjustable in order to permit calibrating the compensating control effect. The resistor may consist or include the resistance of a series field winding on the generator or motor or on both machines if they are equipped with such a winding. The voltage taken from across the series resistor 41 and impressed upon the compensating control winding 40 of reactor 33 is proportional to the armature current of the drive. Consequently, the magnetizing effect of control winding 40 on the reactor is a function of the load imposed upon the drive. This magnetizing effect increases with an increase in motor load and causes, through rectifier 29, an increase in field excitation of the generator G.

Aside from the electric machines of the variable-voltage drive proper, the above described system is exclusively equipped with static devices which are practically free of wear and favorably distinguished by low inertia, thus combining simplicity of design with a reliable maintenance-free operation. Any disturbance between the desired and the actual value of the generator voltage or speed immediately produces in its incipient state a correcting regulation thus forestalling any noticeable drop or increase in motor speed.

A drive according to the invention and as described in the foregoing is particularly advantageous for planers or similar machines subject to sudden or frequent reversal. At the moment where the motor reaches standstill, the voltage U, and hence the voltage $U_2$, is zero. Consequently, at this moment an especially high differential voltage equal to the adjusted constant reference voltage $U_1$ is now effective to impose a strong forcing effect upon the field of the generator making it much stronger, for instance, twice as strong, than during normal, constant-speed operation. This forcing effect accelerates the reversing operation of the motor but vanishes gradually as the motor reaches full speed in the reversed direction. In this manner, a favorable rapid excitation with an initial and automatically vanishing over-excitation is secured.

It will be obvious to those skilled in the art upon a study of this disclosure that my invention permits of various modifications as regards circuit connections and circuit components other than those specifically illustrated and described, without departing from the essential features of my invention and within the scope of the claims annexed hereto.

I claim:

1. A variable-voltage drive, comprising a drive motor and a generator having a common armature circuit, said generator having two cumulative field windings, two resistors series connected with said windings in alternating sequence and forming with said windings a loop circuit having respective diagonal pairs of terminals between said windings and said resistors, constant-voltage supply means, a speed control rheostat of adjustable resistance series-connected with one of said terminal pairs across said supply means to apply to said windings an adjusted constant excitation in accordance with a desired motor speed, adjustable circuit means of constant voltage having an adjustable member for setting said constant voltage to different values in accordance with respectively different settings of said excitation, condition-responsive circuit means connected with said motor to provide a variable voltage substantially dependent upon the motor speed, and a magnetic amplifier having a saturable reactor and rectifier means connected to said other pair of terminals to superimpose on said windings a variable excitation, said reactor having control winding means connected between said adjustable circuit means and said condition-responsive circuit means to be differentially energized by said adjusted constant voltage and said variable voltage.

2. In a variable-voltage drive according to claim 1, said adjustable circuit means and said member comprising a resistor and a pertaining slide contact respectively, said resistor being connected across said constant-voltage supply means, and said slide contact being connected with said adjustable member for adjusting the latter in constrained relation to said slide contact.

3. A variable-voltage drive according to claim 1, comprising an additional control winding on said reactor, and current-responsive circuit means connecting said additional winding with said armature circuit for energizing said additional winding in accordance with the current in said armature circuit, said additional winding being poled for decreasing the reactance of said reactor at increasing armature current to thereby increase the generator excitation.

4. A variable-voltage drive, comprising a generator and a motor having a common armature circuit, said generator having field winding means, constant-voltage supply means, an adjustable control rheostat series-connected with said winding means across said supply means to supply to said winding means an adjusted constant excitation in accordance with a desired motor speed, a voltage divider connected across said supply means and having an adjustable tap member connected with said rheostat to tap from said divider a reference voltage of a constant magnitude dependent upon said adjusted excitation, condition-responsive voltage supply means connected with said motor to provide a variable voltage substantially dependent upon the motor speed, said condition-responsive supply means having a point of fixed potential in common with said voltage divider, a magnetic amplifier having a saturable reactor and rectifier means series connected with each other, said rectifier means being connected with said field winding means to superimpose variable excitation upon said adjusted constant excitation, said reactor having a control winding for controlling said variable excitation and said control winding being connected between said tap member and said condition-responsive supply means and having a voltage drop according to the difference of said reference voltage and said variable voltage, and said field winding means having relative to said rectifier means the polarity of connection for which said constant excitation and said variable excitation are cumulative at motor speeds below said desired speed.

5. A variable-voltage drive, comprising a generator and a motor having a common armature circuit, said generator having field winding means, constant-voltage supply means, an adjustable control rheostat series-connected with said winding means across said supply means to apply to said winding means an adjusted constant excitation in accordance with a desired motor speed, a voltage divider connected cross said supply means and having an adjustable tap member to provide a reference voltage of an adjusted constant magnitude, condition-responsive voltage supply means connected with said motor to provide a variable voltage substantially proportional to the motor speed, said condition-responsive supply means having a point of fixed potential in common with said voltage divider, a magnetic amplifier having an alternating-current circuit and having a saturable reactor and rectifier means series connected with each other in said latter circuit, said rectifier means being connected with said field winding means to superimposed variable excitation upon said adjusted constant excitation, said reactor having a control winding for controlling said variable excitation, said control winding being connected between said tap member and said condition-responsive supply means and having a voltage drop according to the difference of said reference voltage and said variable voltage, and said constant excitation and said variable excitation having the same poling relative to said field winding means at motor speeds below said desired speed.

References Cited in the file of this patent

UNITED STATES PATENTS

| | | |
|---|---|---|
| 1,048,548 | Kramer | Dec. 31, 1912 |
| 1,060,208 | Osborne | Apr. 29, 1913 |
| 2,468,117 | Schaelchlin et al. | Apr. 26, 1949 |
| 2,504,105 | Bendz | Apr. 18, 1950 |
| 2,519,339 | Avery | Aug. 22, 1950 |